No. 841,067. PATENTED JAN. 8, 1907.
O. L. STUMP, J. REIDENBAUGH & E. D. PACKARD.
WATER PURIFYING PROCESS.
APPLICATION FILED OCT. 8, 1906.
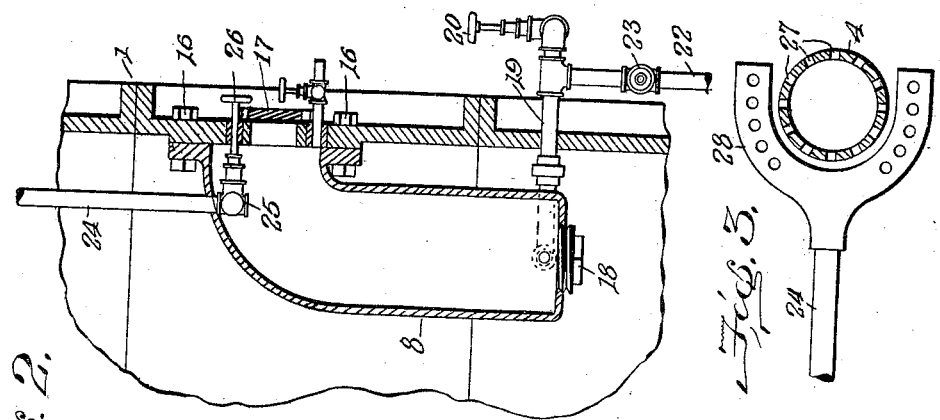
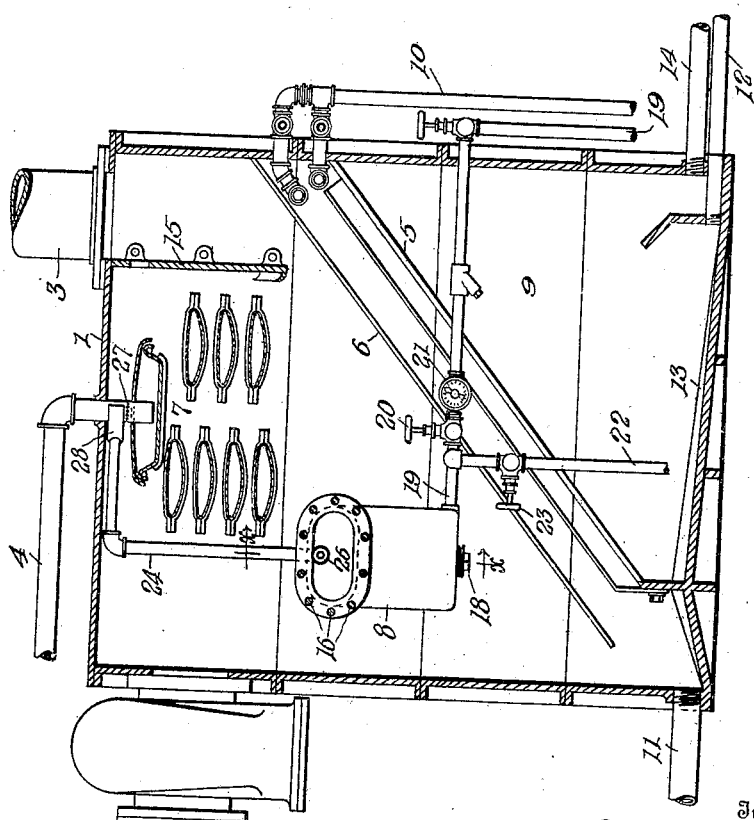
Witnesses
G. Howard Walmsley
Edward L. Reed
Inventors
Oman L. Stump,
John Reidenbaugh,
Edwin D. Packard,
By H. A. Toulmin,
Attorney

UNITED STATES PATENT OFFICE.

OMAN L. STUMP, JOHN REIDENBAUGH, AND EDWIN D. PACKARD, OF MARION, OHIO, ASSIGNORS TO THE MARION INCLINE FILTER AND HEATER COMPANY, OF MARION, OHIO, A CORPORATION OF OHIO.

WATER-PURIFYING PROCESS.

No. 841,067.

Specification of Letters Patent.

Patented Jan. 8, 1907.

Original application filed June 22, 1906, Serial No. 322,911. Divided and this application filed October 8, 1906. Serial No. 337,867.

*To all whom it may concern:*

Be it known that we, OMAN L. STUMP, JOHN REIDENBAUGH, and EDWIN D. PACKARD, citizens of the United States, residing at Marion, in the county of Marion and State of Ohio, have invented certain new and useful Improvements in Water-Purifying Processes, of which the following is a specification, reference being had therein to the accompanying drawings.

This invention relates to improvements in water-purifying processes, and the particular feature of the invention is a method of introducing into the water the reagent or chemical employed to effect chemical action on the water to aid in the collection of impurities contained therein. Heretofore this reagent, usually soda-ash, has been contained in a tank placed wholly exterior to the purifying apparatus and a solution of the reagent was carried into the apparatus by means of a system of piping. This has involved two essential difficulties. The first was the formation of incrustation in the pipe for conveying the solution from the tank to the purifying apparatus. This difficulty has led to various inventions or efforts to prevent this incrustation. The second difficulty has been to introduce the solution into the purifying apparatus without suffering back pressure or back action produced by the pressure of the cold-water supply. To overcome this difficulty, resort has been had to efforts to find a place in the cold-water pipe or in the purifying apparatus near the pipe where the back pressure of the feed-water would not oppose the introduction of the solution into the purifying apparatus. Thus these several difficulties have led to expensive and cumbersome methods for overcoming or attempting to overcome them. By our invention we entirely avoid all such difficulties and entirely eliminate all resort to devices and means for counteracting or overcoming such difficulties.

Our invention comprises the process hereinafter described, which consists in generating a reagent chemical solution for acting on the water in the purifier to effect the collection of impurities, such generation being performed inside the purifier and under the influence of the heat in the purifier, and in introducing this solution in a heated state into the water to be purified. In carrying out our invention we employ suitable apparatus and have shown in the accompanying drawings one form of such apparatus.

In the accompanying drawings, Figure 1 is a sectional view of a purifying apparatus used to purify feed-water for steam-boilers, being preferably of the type in respect to the filtering means embodied in Letters Patent issued to one of us, O. L. Stump, January 23, 1906, for feed-water heaters, No. 810,441, the drawing illustrating our invention in connection therewith; Fig. 2, a sectional view on the line *x x* of Fig. 1 looking in the direction of the arrows and showing the reagent-tank applied within the purifying apparatus; and Fig. 3, an inverted plan and sectional view of the chemical-solution pipe and the cold-water-supply pipe, showing the perforations therein.

Our present invention is a division of the application filed by us June 22, 1906, Serial No. 322,911, for water-purifying apparatus, and comprises a process for accomplishing the objects above set forth. This process consists in producing or generating a reagent chemical solution for acting on the water in the purifier to effect the collection of the impurities, such production or generation being done inside of the purifier and under the influence of the heat, as exhaust-steam, in the purifier, and in introducing this solution in a heated state into the water to be purified. Our process further consists in conducting the solution from the place of production or generation to the place of intermixing with the water to be purified under and while subjected to the heat in the purifier, this step being practiced when the point of mixing the solution with the water is more or less remote from the point where the solution is produced or generated, and a further step in our process consists in intermixing this heated solution with the water to be purified just prior to the distribution of the water over the purifying-pans.

In the accompanying drawings we have shown an apparatus suitable for carrying out our process, and this apparatus is shown as a whole at 1, having an exhaust-steam inlet 2 and an exhaust-steam outlet 3, a cold or feed water inlet pipe 4, with a filtering-bed 5 dividing the purifier into a compartment 6 for the trays or pans (generally indicated at 7) for heating the water and precipitating its lime and other impurities and for the chemical-tank 8, and into a lower compartment 9 for the filtered water. A pipe 10 is utilized to conduct water to wash the filter-bed, a pipe 11 to draw off the collected impurities and sediment which gather in the lower part of the compartment 6, a pipe 12 to draw off the sediment, if any, from the bottom 13 of the filtered-water compartment, and a pipe 14 to draw off the filtered water and conduct it thence to the boiler-feed-water pump. A baffle-wall 15 may also be used to confine the steam about the purifying-pans 7, which may be of any suitable construction. 8 designates a tank or vessel constituting a third compartment in the purifying apparatus 1. This tank is secured, preferably by bolts, as shown at 16, to one of the side walls of the purifier. A removable door 17 gives access to the interior of the tank for charging the chemical—say soda-ash—the solution of which is to be utilized as the reagent to produce the chemical action on the water to cause its impurities to collect. The bottom of the tank is provided with a removable screw-plug 18, which constitutes one mode of permitting the tank to be cleaned out. In the lower part of the tank is introduced a feed-water pipe 19, having a cock 20, by which it may be opened and closed, and a gage 21 to indicate the speed or rapidity with which the water is being fed into the tank. This pipe extends alongside of the purifier until it gets opposite the chemical-tank, where it turns and goes through the wall of the purifier and enters the chemical-tank, as shown particularly in Fig. 2. In this manner the chemical-tank is charged with water to mix with the chemical or soda-ash to produce the necessary solution. A drain-pipe 22, controlled by a cock 23, branches from the feed-pipe 19 between the tank and the cock 20, so that on closing the cock 20 and opening the cock 23 the tank may be drained. A solution-pipe 24, controlled by a cock 25, whose stem and handwheel 26 are accessible outside of the purifier, extends from the chemical-tank to the point where the solution is to be introduced into the water in the purifier. By preference this point is at the cold-water-feed pipe just inside of the purifier, where such pipe has perforations 27, through which the water sprays, while the pipe 24 has a nozzle 28, also perforated, to spray the solution. Thus the solution and the incoming water are intimately mixed, and this at a time before such water is conducted over the purifying-pans. This place of intermixture is not vital, but is preferred.

While we have described a particular apparatus for carrying out our invention, it is to be understood that the process may be carried out by means of other apparatus than that above described, this apparatus having been chosen merely for purposes of illustration.

Having thus fully described our invention, what we claim as new, and desire to secure by Letters Patent, is—

1. The process herein described for producing a reagent chemical solution for treating water to be purified, consisting in subjecting the reagent to the water in a heated place and in discharging the resulting solution in a heated state into the water to be purified.

2. The process herein described consisting in placing a reagent inside of a water-purifier, in applying the heat used in the purifier to said reagent and in simultaneously introducing water into said reagent, in thereby producing a hot chemical solution and in introducing said solution while hot into the water to be purified.

3. The herein-described process consisting in confining a reagent in a vessel inclosed in a water-purifier and subjected to the heat contained therein, in introducing a current of water into the reagent so situated, in conducting from the vessel the resulting solution in a heated state, and in introducing such solution into the water to be purified in advance of the purifying-pans of the purifier.

In testimony whereof we affix our signatures in presence of two witnesses.

OMAN L. STUMP.
JOHN REIDENBAUGH.
EDWIN D. PACKARD.

Witnesses:
ROBERT G. LUCAS,
EARL J. WITTHOFF.